United States Patent [19]

Shirakawa et al.

[11] Patent Number: 5,283,709
[45] Date of Patent: Feb. 1, 1994

[54] LIGHTNING ARRESTER ON TOWER FOR POWER TRANSMISSION

[75] Inventors: Shingo Shirakawa; Syuichi Terakado; Jun Ozawa, all of Hitachi; Kazuya Ooishi, Ibaraki, all of Japan

[73] Assignee: Hitachi, Ltd., Tokyo, Japan

[21] Appl. No.: 620,057

[22] Filed: Nov. 30, 1990

[30] Foreign Application Priority Data

Dec. 7, 1989 [JP] Japan .................. 1-316414

[51] Int. Cl.⁵ .................... H02H 1/00; H02H 3/22
[52] U.S. Cl. ...................................... 361/117
[58] Field of Search ............ 361/111, 117, 126, 132, 361/131, 56, 128; 174/2; 337/28, 32, 33, 34; 340/635, 649

[56] References Cited

U.S. PATENT DOCUMENTS

| | | | |
|---|---|---|---|
| 2,677,817 | 7/1950 | Rorden et al. | 361/117 |
| 3,586,913 | 6/1971 | Olsen | 361/117 |
| 3,875,466 | 4/1975 | Jakszt | 361/117 |
| 4,262,318 | 4/1981 | Shirakawa et al. | 361/127 |
| 4,706,016 | 11/1987 | Schweitzer, Jr. | 361/111 |
| 4,864,455 | 9/1989 | Shimomura et al. | 361/117 |

FOREIGN PATENT DOCUMENTS 1156092 12/1958 France .
2603418 3/1988 France .
61-260506 11/1986 Japan .

*Primary Examiner*—A. D. Pellinen
*Assistant Examiner*—Ronald W. Leja
*Attorney, Agent, or Firm*—Antonelli, Terry, Stout & Kraus

[57] ABSTRACT

Disclosed is a lightning arrester provided for a power transmission line so as to prevent damage to a line-supporting insulator string due to lightning stroke. A lightning arrester unit is fixedly supported on a fitting fixed to an arm structure of a tower in a relation in which its grounded side is electrically insulated from the fitting, and an operation detection device is connected between the grounded side of the lightning arrester unit and the fitting. The operation detection device is in the form of an operation indicator, a flashover indicator and/or an operation recorder. In the event of impartation of a lightning stroke, the operation detection device detects lightning current flowing from the grounded side of the lightning arrester unit toward the fitting.

23 Claims, 17 Drawing Sheets

6A

F I G. 14
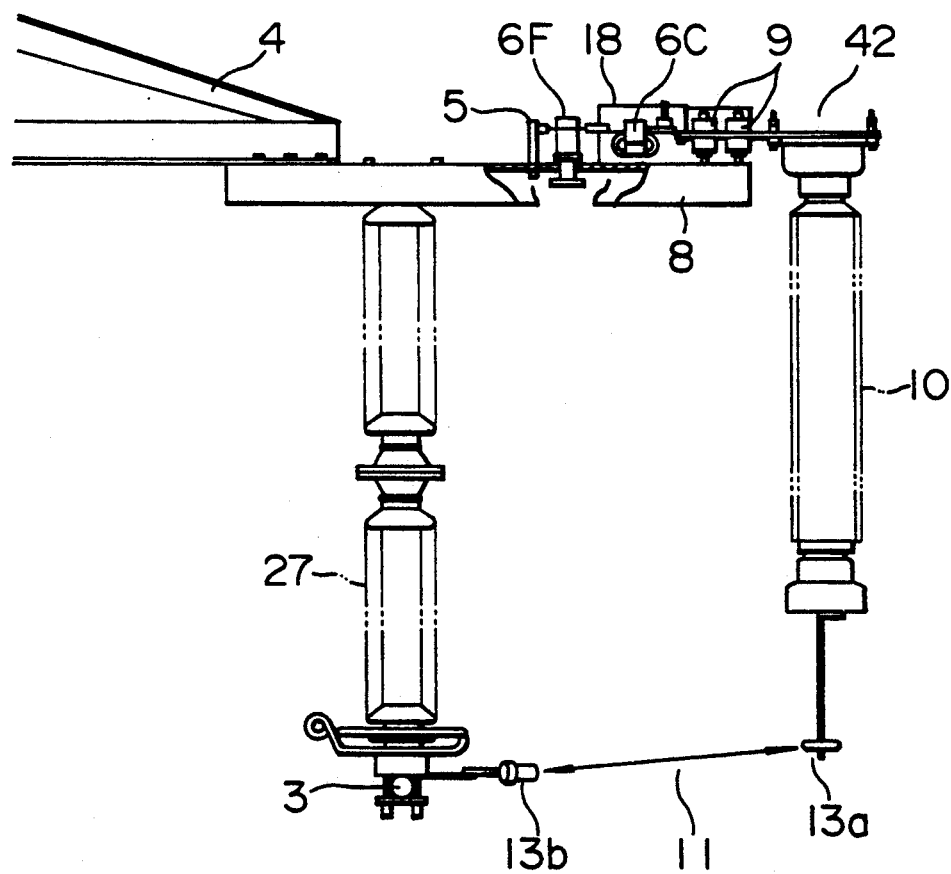

F I G. 23

| NAME OF DEVICE | REFER- ENCE SYMBOL | FEATURE AND MANNER OF FAILURE IDENTIFICATION |
|---|---|---|
| FAILURE INDICATION | 6 A | SEPARATION OF A CONTAINER DUE TO EXPLOSION OF INTERNAL PRIMING POWDER IS VISUALLY OBSERVED |
| | 6 B | SEPARATION OF A PLASTIC CONTAINER DUE TO FUSION OF AN INTERNAL FUSE IS VISUALLY OBSERVED |
| | 6 D | PROTRUSION OF INDICATOR CLOTH DUE TO EX- PLOSION OF PRIMING POWDER IN AN INDICATOR PART AS A RESULT OF DETECTION OF FAILURE CURRENT BY A CURRENT TRANSFORMER IS VISUALLY OBSERVED |
| | 6 F | PROTRUSION OF INDICATOR CLOTH DUE TO EXPLOSION OF INTERNAL PRIMING POWDER IS VISUALLY OBSERVED |
| FLASHOVER INDICATOR | 6 C | PROTRUSION OF COLORED INDICATOR CLOTH DUE TO EXPLOSION OF PRIMING POWDER AS A RESULT OF DETECTION OF LIGHTNING SURGE CURRENT BY A CURRENT TRANSFORMER IS VISUALLY OBSERVED |
| OPERATION RECORDER | 6 E | MAGNETIC FLUX PRODUCED BY CURRENT IS RECORDED, AND, AFTER DEVELOPMENT, THE RECORDED RANGE IS BASED TO MEASURE THE CURRENT VALUE |

5,283,709

LIGHTNING ARRESTER ON TOWER FOR POWER TRANSMISSION

BACKGROUND OF THE INVENTION

This invention relates to a lightning arrester system for a power transmission line for preventing damage of an insulator string supporting the power transmission line on a tower by a lightning stroke.

A prior art lightning arrester system of the aforementioned type this kind is disclosed in, for example, JP-A-61-260506 and is shown in FIG. 1 wherein, a suspension insulator string 32; consisting of a series of a plurality of suspension insulators, is suspended at its upper end from the bottom of an arm structure 4 of a tower and supports a power transmission line 3 at its lower end. A lightning isolator unit 10 is fixed at its upper end to a free end 33A of a fitting 33 fixed at the other end to the arm structure 4 of the tower, and a series gap 37 is formed between a discharge electrode 38, fixed to the lower end of the lightning isolator unit 10, and a discharge electrode 36 fixed to the suspension insulator string 32 on the side of the power transmission line 3.

Thus, in the prior art lightning system arrester, the series connection of the lightning isolator unit 10 and the series gap 37 is arranged in an electrically parallel relationship to the suspension insulator string 32. Therefore, when a surge due to a lightning stroke is applied to the power transmission line 3, discharge occurs across the series gap 37, and the lightning isolator unit 10 interrupts the flow current having a small current value, so that flashover across the suspension insulator string 32 is prevented.

However, in the prior art lightning arrester, the lightning isolator unit 10 is directly connected at its grounded side by the fitting 33 to the tower arm structure 4 having the ground potential, and the grounded side of the lightning isolator unit 10 and the fitting 33 have the same ground potential. Because of the above arrangement, the protective effect of the lightning isolator unit 10 from the viewpoints of confirmation of the operation of the lightning isolator unit 10, indication of failure of the lightning isolator unit 10 in the event of occurrence of an accident, etc. could not be fully determined grasped.

SUMMARY OF THE INVENTION

It is a principal object of the present invention to provide a lightning arrester for a power transmission line, which can accurately recognize the lightning arresting operation of a lightning arrester system and accidental failure of the lightning arrester system so as to facilitate grasping of the protective effect of the lightning arrester system.

Another object of the present invention is to protect the lightning arrester system by provision of a detection device which detects lightning current flowing from the grounded side of the lightning arrester system when a lightning stroke is applied.

Still another object of the present invention is to provide such a small size lightning arrester of small size by collectively disposing a plurality of operation detection means in a compact relation in the vicinity of the lightning arrester system.

According to the present invention a lightning arrester system includes isolator unit, electrically insulated at its grounded side is with the isolator unit being fixedly supported by a fitting fixed to an arm structure of a tower, and a failure detection device is connected between the grounded side of the lightning isolation unit and the fitting.

By virtue of the feature of the lightning arrester system according to the present invention, current flowing from the grounded side of the lightning isolator unit toward the fitting can be detected by the operation detection device which may be, for example, an operation recorder or an operation indicator, so that the protective effect of the lightning isolator unit can be readily determined.

BRIEF DESCRIPTION OF THE DRAWINGS

Preferred embodiments of the present invention will now be described in detail in conjunction with the accompanying drawings, in wherein:

FIG. 14 is a front elevational view of a sixth embodiment of the lightning arrester of the present invention;

FIG. 23 is a table showing the features and manners of failure identification of the operation indicators, the flashover indicator and the operation recorder used in the present invention.

DESCRIPTION OF THE PREFERRED EMBODIMENTS

Figure 1:
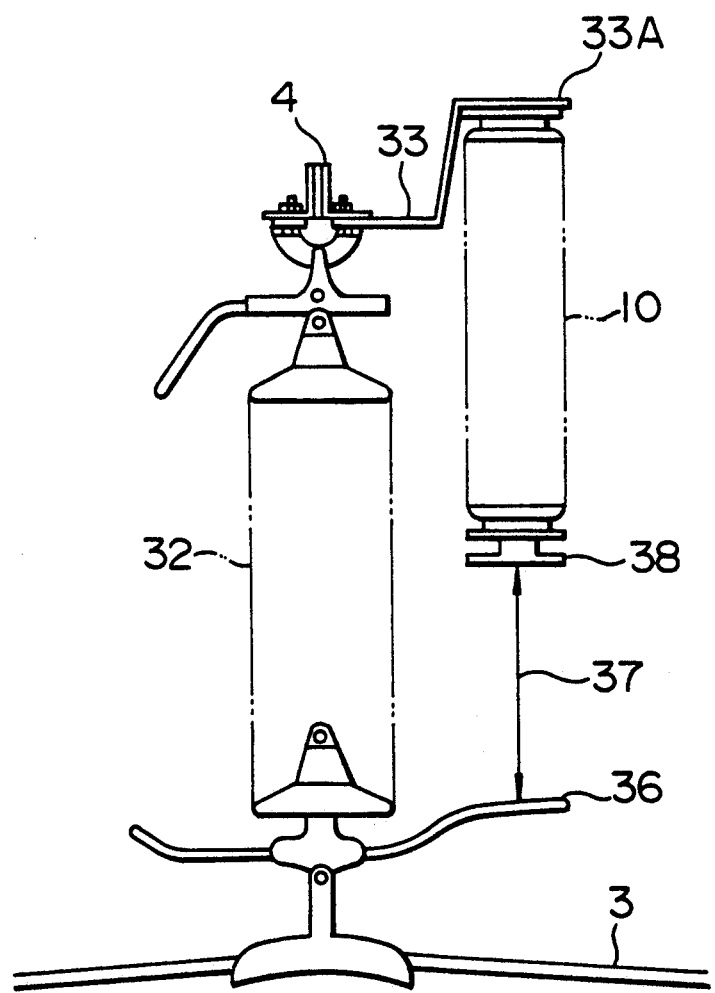
FIG. 1 is a front elevational view of a prior art lightning arrester system unit on a tower for a power transmission line.

Preferred embodiments of the present invention will now be described in detail with reference to the drawings. In the drawings, the same reference numerals are used throughout the various view to designate like parts.

Figure 2:
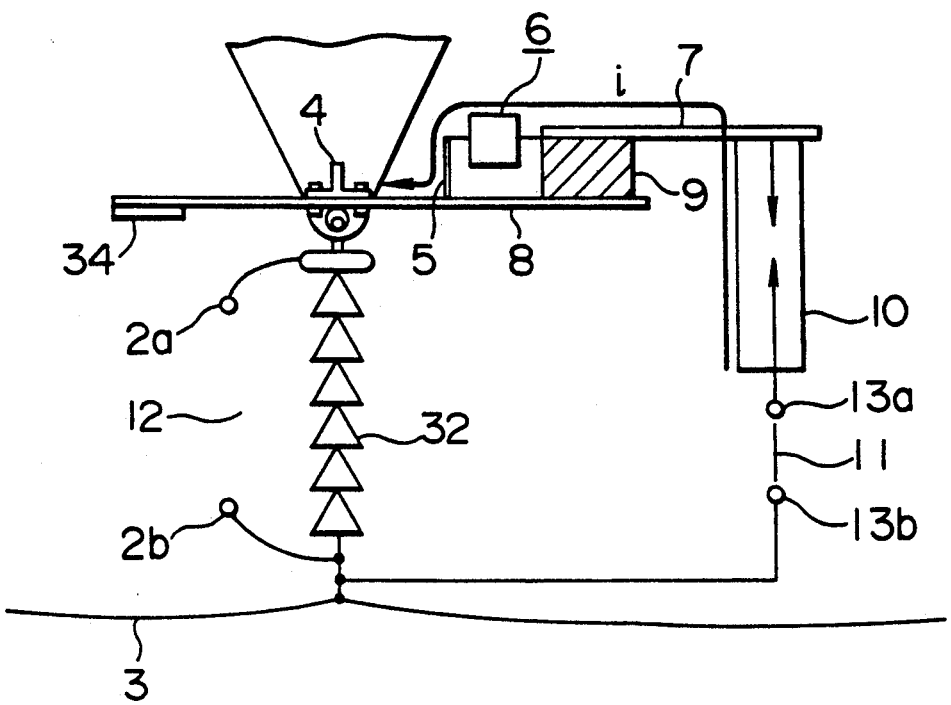
FIG. 2 is a view of the basic Principle of the lightning arrester system of the present invention provided for a power transmission line.

Referring to FIG. 2, a fitting 8, extending in a substantially horizontal direction in a substantially parallel relationship to a power transmission line 3, is fixedly supported, together with one end of a suspension insulator string 32, by an arm structure 4 of a tower (not shown), and the power transmission line 3 is supported by the other or lower end of the suspension insulator string 32. Electrodes 2a and 2b are connected to the upper and lower ends, respectively of the suspension insulator string 32 to form an arc horn (a gap) 12 extending in parallel to the suspension insulator string 32. If desired, the arc horn may be omitted. The fitting 8 is fixed at its longitudinally middle point to the tower arm structure 4, and a weight balancer 34 and a lightning isolator unit 10 are supported by the left-hand and right-hand ends respectively of the fitting 8. A ground-side conductor 7 is fixed at its left-hand end to the right-hand end of the fitting 8 in an electrically insulated relationship from the fitting 8 by a member 9 of an electrical insulator, and the lightning isolator unit 10 is mounted at its grounded side to the right-hand end of the ground-side conductor 7. A discharge electrode 13a is connected to the high voltage side of the lightning isolator unit 10 so as to form a series gap 11 between it and a discharge electrode 13b connected to the suspension insulator string 32 on the side of the power transmission line 3. A grounding conductor 5 is provided on the fitting 8 and connected in series with the ground-side conductor 7 through an operation detection device 6.

Therefore, when a lightning stroke is imparted to the power transmission line 3 thereby applying a lightning surge overvoltage to the power transmission line 3, discharge occurs across the series gap 11, and the dynamic current is interrupted by the lightning isolator unit 10. In this case, current 6 flows through the route from the lightning isolator unit 10 to the tower arm structure 4 through the ground-side conductor 7 the operation detection device 6 the grounding conductor 5 the fitting 8, as shown in FIG. 2. When the current 6 flows through the above route, the operation detection device 6 operates to record the operation of the lightning isolator unit 10 and indicates failure of the proper operation of the lightning isolator unit 10 in the event of occurrence of such failure.

Figure 3:
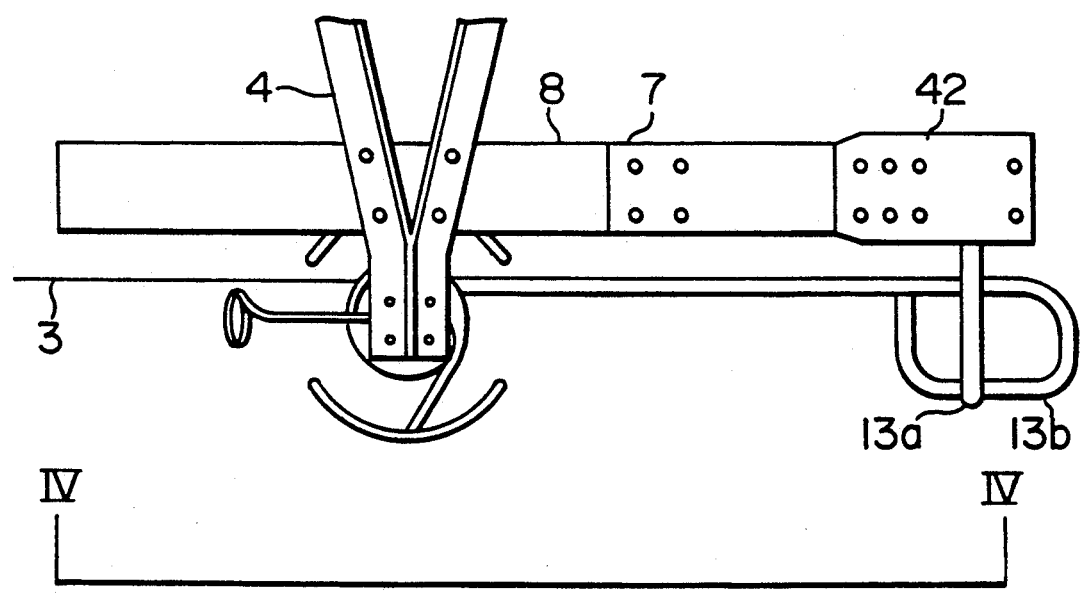
FIGS. 3 and 4 are a plan view and a front elevational view, respectively, of a first embodiment of the lightning arrester system of the present invention.
Figure 4:
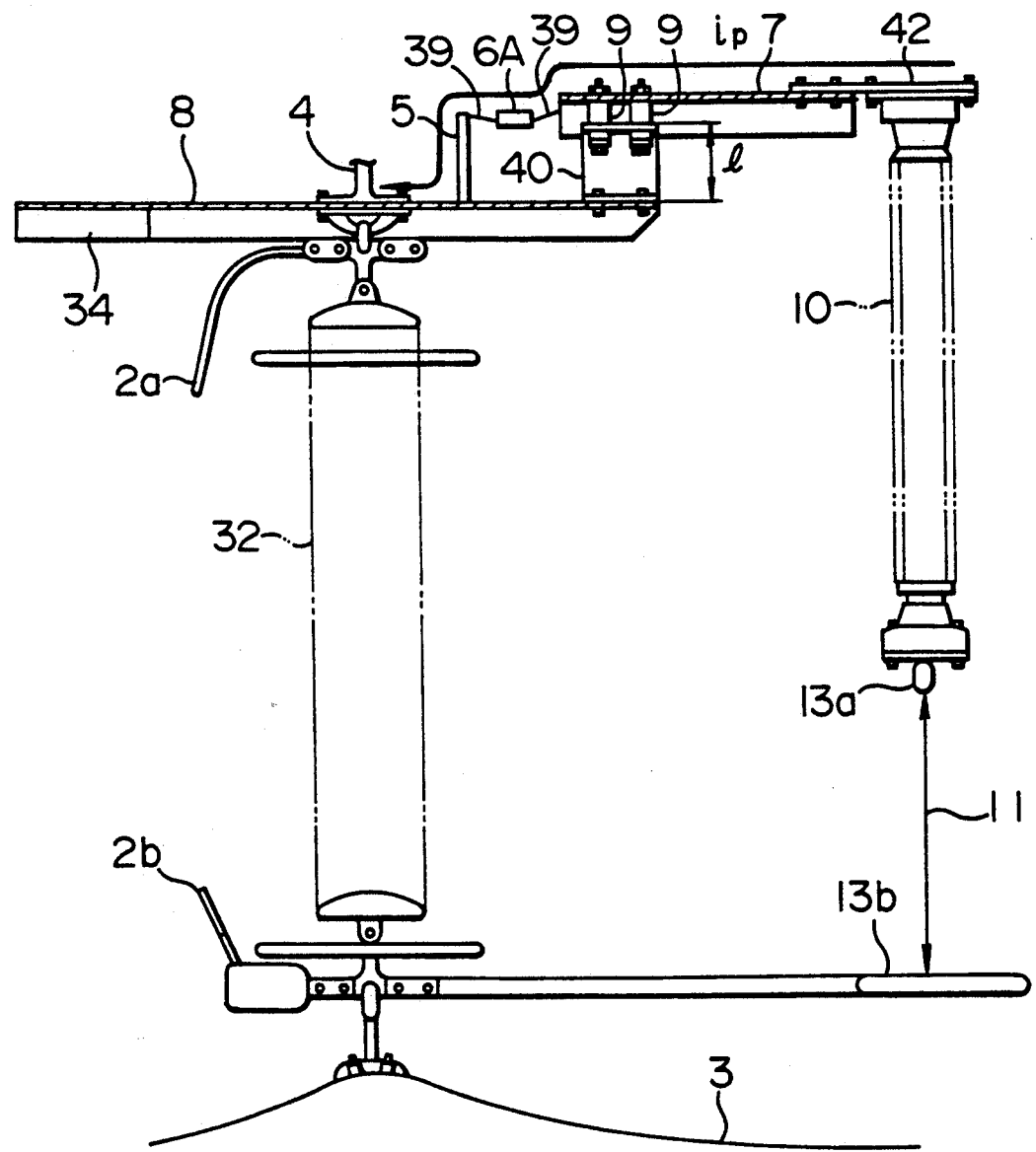

Referring to FIGS. 3 and 4, the fitting 8 has an inverted U-shaped cross sectional configuration and the ground-side conductor 7 has also an inverted U-shaped cross sectional configuration. The left-hand end of the ground-side conductor 7 is disposed vertically opposite to the right-hand end of the fitting 8, and a spaces 40 having an H-shaped cross sectional configuration is interposed between the fitting 8 and the ground-side conductor 7 so as to provide a desired spacing or distance 1 between them. This space 40 is mechanically bolted to both the ground-side conductor 7 and the fitting 8 in such a manner that at least one end of the space 40 is electrically insulated by the electrical insulator members 9. The lightning isolator unit 10 if a conventional construction having the known structure is electrically and mechanically connected at its grounded side to the ground-side conductor 7 by an electrical conductor 42. The grounding conductor 5 is provided on the fitting 8, and, in between the grounding conductor 5 and the ground-side conductor 7, the operation indicator 6A having lead wires 39 extending from its both ends is connected. This operation indicator 6A corresponds to the operation detection device 6 shown in FIG. 2. Therefore, the current path consisting of the ground-side conductor 7, the space 40 and the fitting 8 is interrupted by the insulator members 9, and the path of current 6, consisting of the ground-side conductor 7, one of the lead wires 39, the operation indicator 6A, the other lead wire 39 the grounding conductor 5, the fitting 8 is now established.

Figure 5:
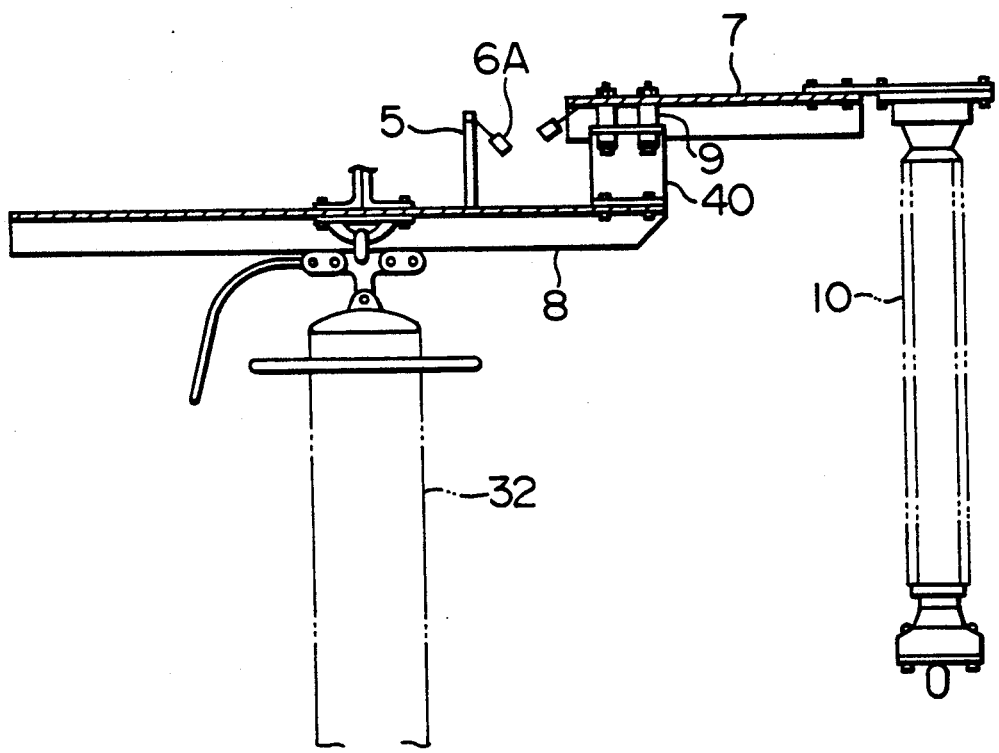
FIG. 5 is a front elevational view showing the state of the apparatus after operation from the state shown in FIG. 4.

The operation indicator 6A, of the conventional type, including priming powder in a container and does not operate in response to a lightning surge current. This indicator 6A operates only in response to a short-circuit current induced when the elements of the lightning isolator unit 10 are shorted. That is, this operation indicator 6A is designed so that it may not operate unless such a short-circuit current is supplied for a predetermined period of time. After the operation indicator A operates, the state of the lightning isolator is turned into a state as shown in FIG. 5. Therefore, failure of the lightning isolator unit 10 can be visually detected by observing the destroyed operation indicator 6A.

Figure 6:
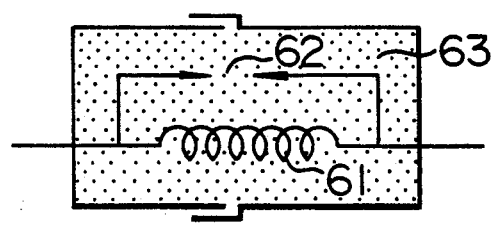
FIG. 6 is a sectional view showing the structure of the operation indicator used in the first embodiment of the present invention.

Referring to FIG. 6, a protective gap 62 is provided in parallel to a current conductor coil 61. When a lightning surge current is supplied, discharge occurs across the protective gap 62, and the current bypasses the coil 61. On the other hand, only when an AC fault current flows, heat generated from the coil 61 causes explosion of the priming powder 63, and the failure indicator 6A is punctured by the explosive force of the priming powder 63, so that failure of the lightning isolator unit 10 can be detected.

Figure 7:
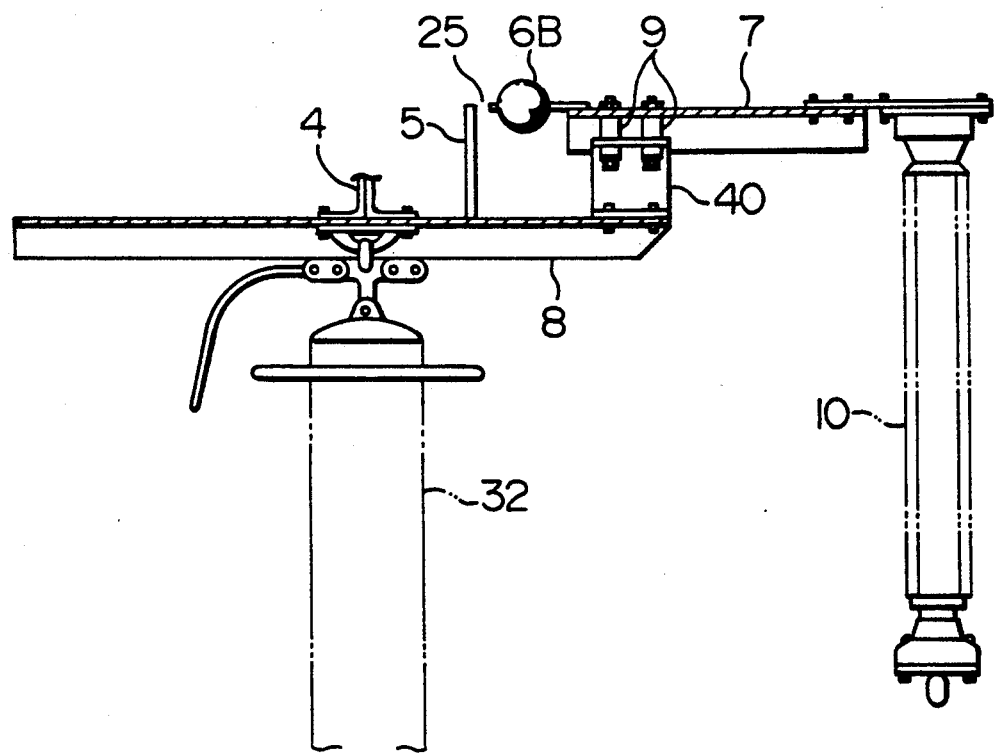
FIG. 7 is a front elevational view of a second embodiment of the lightning arrester system of the present invention.
Figure 8:
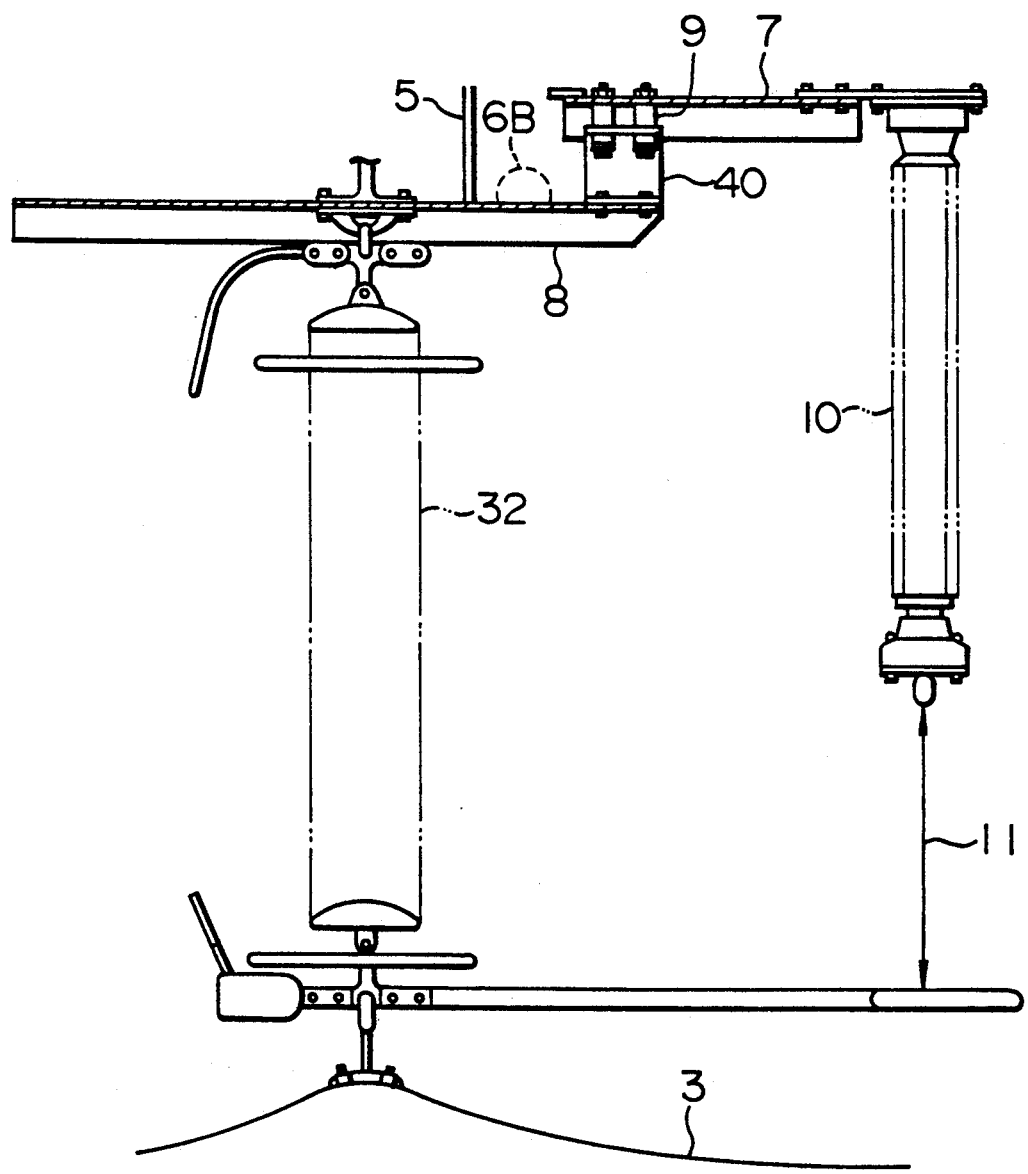
FIG. 8 is a front elevational view showing the state of the apparatus after operation from the state shown in FIG. 7.

FIGS. 7 and 8 show a second embodiment of the present invention in which the operation detection device 6 in the form of an operation indicator 6B, known as a spherical flashover indicator, is employed.

The operation indicator 6B is fixed at its one end to the ground-side conductor 7, and a gap 25 is formed between the other end of the operation indicator 6B and the grounding conductor 5. This operation indicator 6B includes a fuse contained in a spherical container of a plastic material as known in the art, and both ends of this fuse are led out as terminals.

This operation indicator 6B permits a free flow of a lightning surge current as in the first embodiment. However, when the elements of the lightning isolator unit 10 are shorted, and the resultant short-circuit current is supplied, the operation indicator 6B is destroyed and falls from the mounted position-as shown in FIG. 8, so that failure of the lightning isolator unit 10 can be easily detected by visual observation from the outside. In the conventional lightning arrester system formed with the series gap 11 on the side of the power transmission line 3, the voltage being transmitted over the power transmission line 3 is divided by the electrostatic capacity of the elements of the lightning isolator unit 10 and the electrostatic capacity of the series gap 11, and about 30% to 40% of the line voltage is applied to the lightning isolator unit 10, with the result being that the elements of the lightning isolator unit 10 may be deteriorated by repeated application of the divided voltage.

However, this adverse effect can be eliminated by the formation of the gap 25 on the grounded side of the lightning isolator unit 10. This gap 25 can also be applied to the first embodiment shown in FIG. 4.

Figure 9:
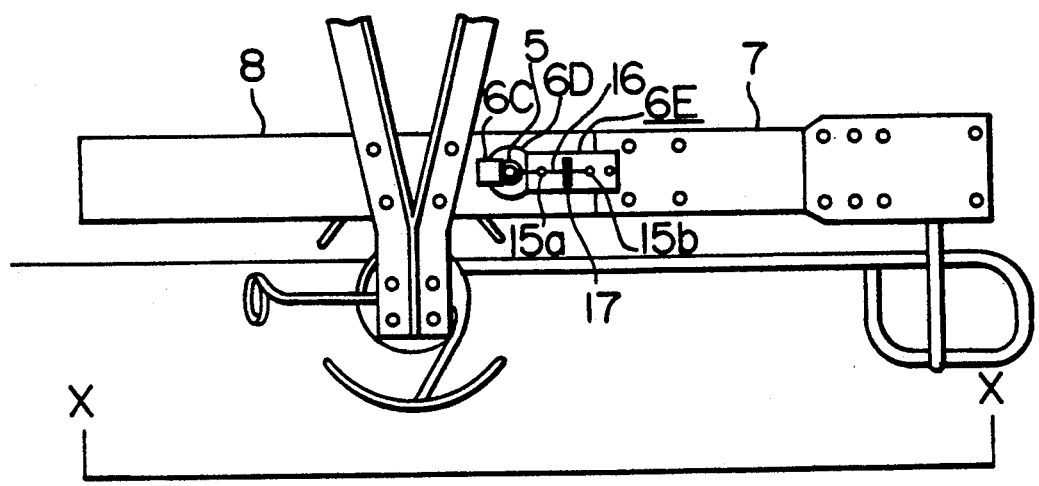
FIGS. 9 and 10 are a plan view and a front elevational view, respectively, of a third embodiment of the lightning arrester system of the present invention.
Figure 10:
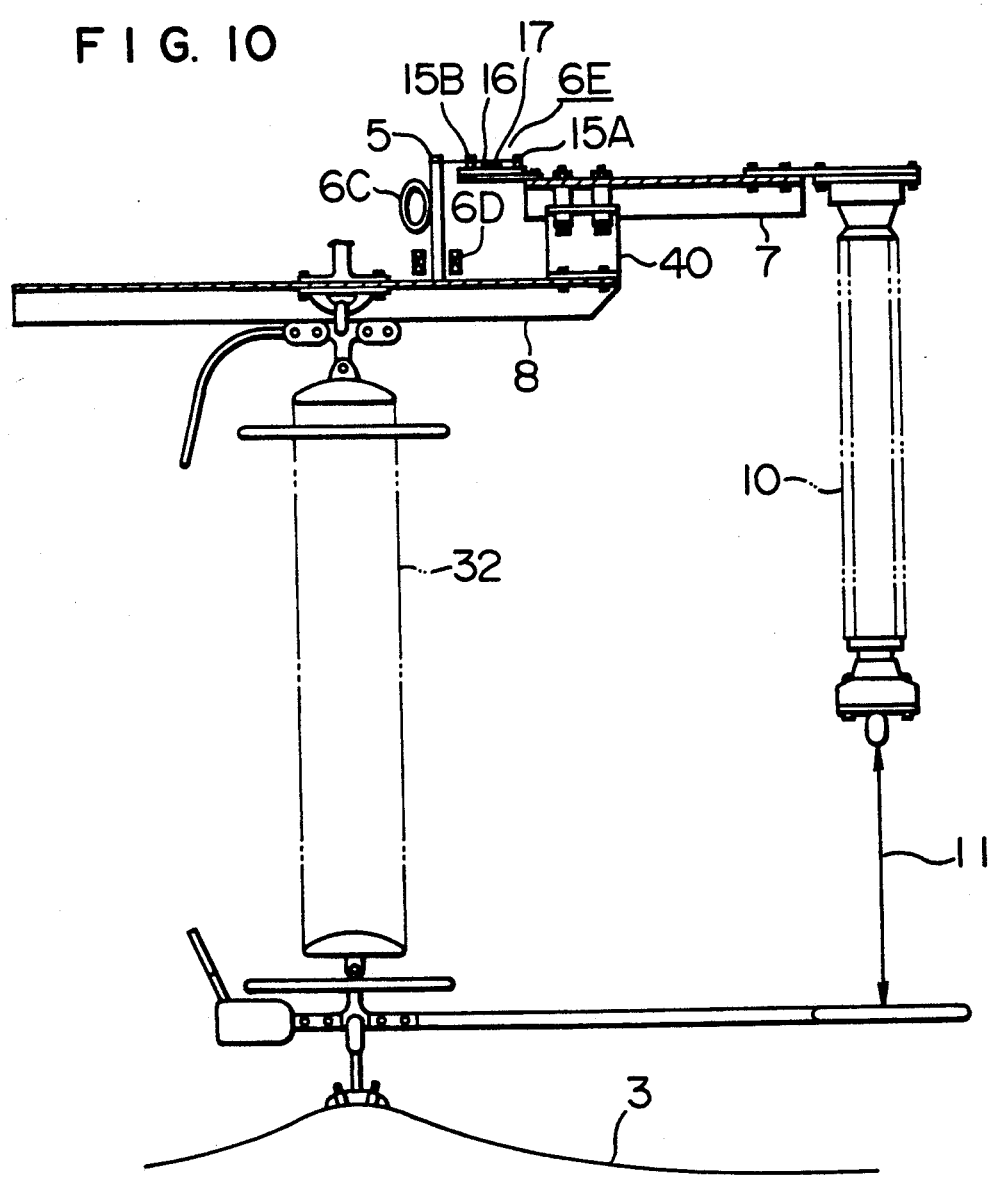

In the third embodiment of FIGS. 9 and 10, the lightning arrester system of the present invention, a flashover indicator 6C, an operation indicator 6D and an operation recorder 6E are provided as the failure detection device 6.

The construction of the embodiment of FIGS. 9 and 10 is generally the same as the embodiment of in FIG. 4 that the ground-side conductor 7 is connected in electrically insulated relationship to the fitting 8. The grounding conductor 5 is provide on the fitting 8, and a current transformer surrounding this grounding conductor 5 so as to detect current flowing through the grounding conductor 5 functions as the failure indicator 6D. The flashover indicator 6C is located in the vicinity of the grounding conductor 5 so as to indicate the operation of the lightning isolator unit 10. The operation recorder 6E is located between the grounding conductor 5 and the ground-side conductor 7. That is, the operation recorder 6E is of the type in which a magnetic tape 17 is disposed beneath a conductor 16 connecting the grounding conductor 5 and the ground-side conductor 7 to terminals 15a and 15b, respectively, and the magnetic flux produced by the current flowing through the conductor 16 is recorded on the magnetic tape 17.

According to the embodiment of FIGS. 9 and 10, the peak value of lightning surge current flowing through the lightning isolator unit 10 can be recorded on the magnetic tape 17 by the operation recorder 6E. Further, the flashover indicator 6C and the operation indicator 6D can detect the operation of the lightning isolator unit 10 and can detect failure of the lightning isolator unit 10 on the basis of the current flowing through the elements of the lightning isolator unit 10, respectively.

In each of the embodiments shown in FIGS. 3 to 10, the spacer 40 is disposed between the fitting 8 and the ground-side conductor 7. Therefore, even when the axial length of the lightning isolator unit 10 or the gap length of the series gap 11 is changed, such a case can be easily dealt with by correspondingly changing the axial length of the spacer 40.

Figure 11:
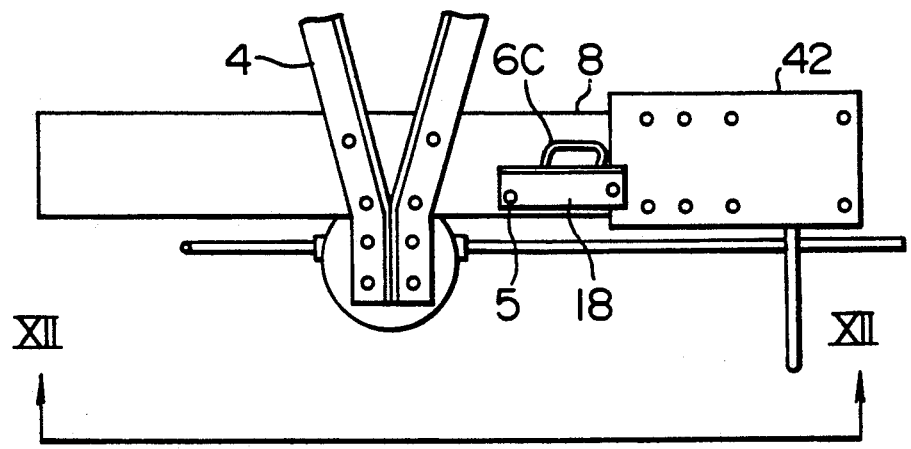
FIGS. 11 and 12 are a plan view and a front elevational view respectively of a fourth embodiment of the lightning arrester system of the present invention.
Figure 12:
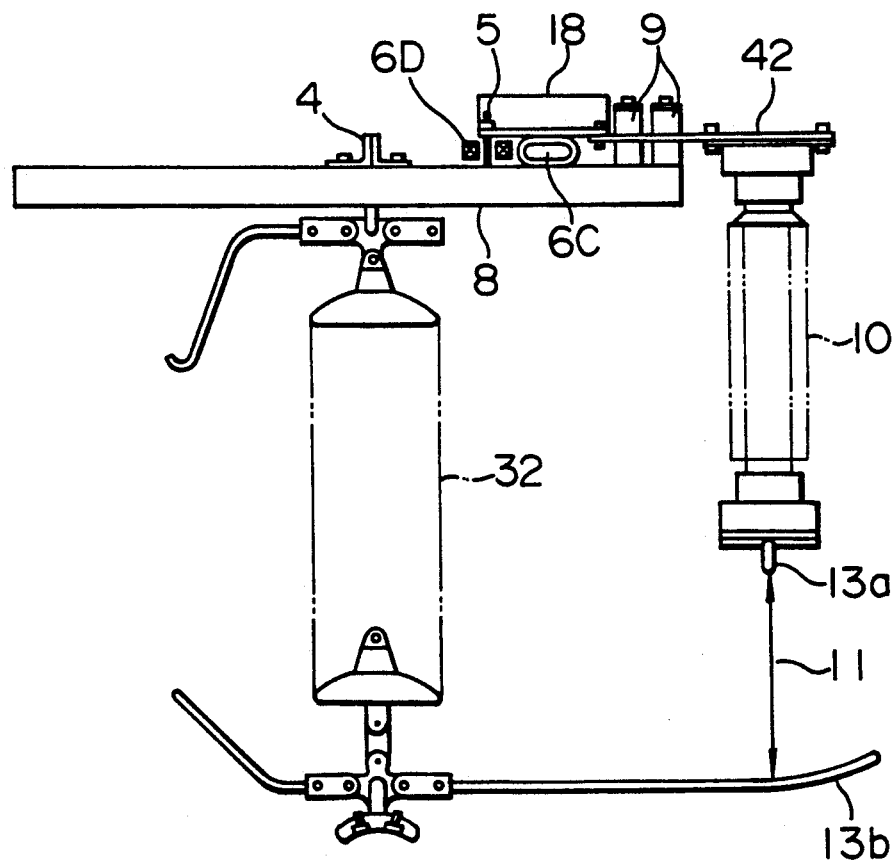

In the fourth embodiment of FIGS. 11 and 12 of the lightning arrester system of the present invention in which the suspension insulator string 32 has a small axial length, and the series gap 11 has a small gap length.

In the embodiment of FIGS. 11 and 12, the left-hand end of a conductor 42 fixed to the upper end of the lightning unit 10 is disposed vertically opposite to the right-hand end of the fitting 8 having the inverted U-shaped cross sectional configuration, and the conductor 42 and the fitting 8 are mechanically connected to and electrically insulated by the insulator members 9 without interposing the spacer 40 therebetween and in the arrangement shown in FIG. 4. An L-shaped conductor 18 is electrically and mechanically connected at its right-hand end to the left-hand end of the conductor 42. The left-hand end of this L-shaped conductor 18 is electrically connected to and mechanically fixed to the fitting 8 by the grounding conductor 5 erected on the fitting 8. Therefore, the fitting 8 and the conductor 18 are spaced apart by the distance determined by the axial length of the insulator members 9. In this space, the operation indicator 6D, in the form of the current transformer surrounding the grounding conductor 5, is disposed together with the flashover indicator 6C located opposite to the conductor 18.

Figure 13:
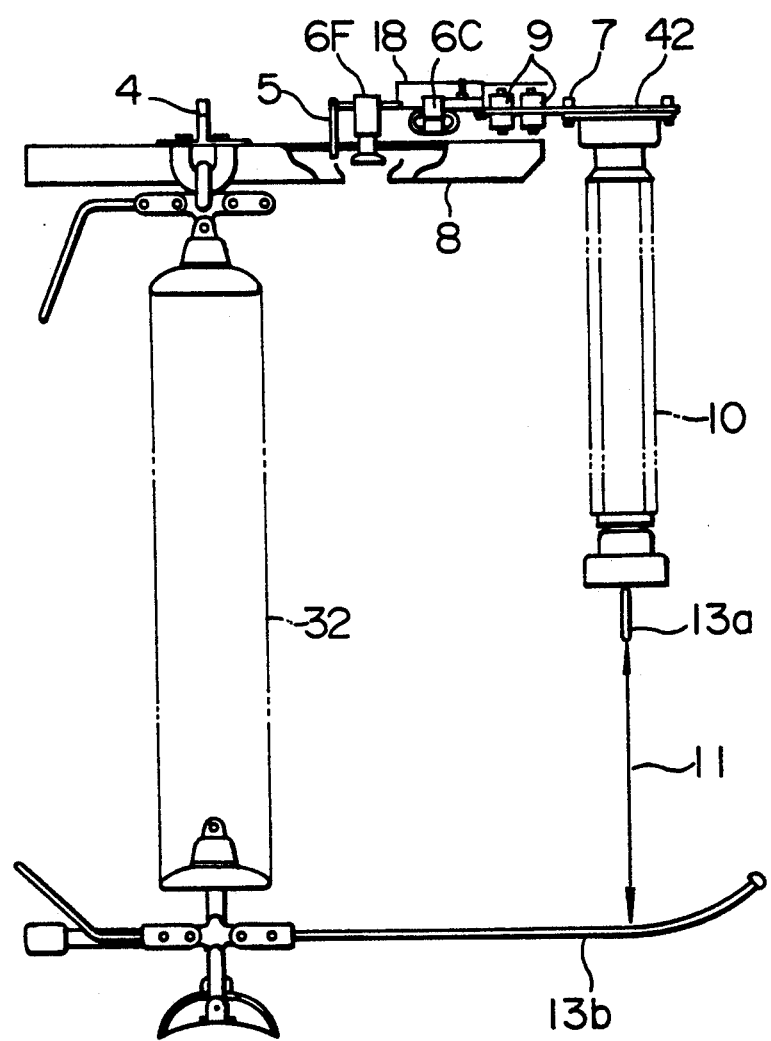
FIG. 13 is a front elevational view of a fifth embodiment of the lightning arrester of the present invention.

The fifth embodiment of the present invention illustrated in FIG. 13 is an improvement of the embodiment shown of FIGS. 11 and 12, and the flashover indicator 6C and an operation indicator 6F are provided as the operation detection device 6. The fifth embodiment is generally the same as the fourth embodiment shown in FIGS. 11 and 12 in that the ground-side conductor 7 is connected in electrically insulated relation to the fitting 8.

Referring to FIG. 13, the operation indicator 6F is electrically and mechanically connected between the grounding conductor 5 provided on the fitting 8 and the L-shaped conductor 18. The operation indicator 6F, of conventional construction containing priming powder in a container, does not operate in response to a lightning surge current but operates only in response to a short-circuit current induced when the elements of the lightning isolator unit 10 are shorted. Thus, failure of the lightning isolator unit 10 can be visually detected by observing the operation indicator 6F. The flashover indicator 6C is mounted on the L-shaped conductor 18.

In the sixth embodiment of FIG. 14 of the lightning arrester system of the present invention includes an insulator assembly 27 supporting the power transmission line 3 used in lieu of the suspension insulator string 32 of FIG. 13.

Referring to FIG. 14, the discharge electrode 13b is connected to the lower end of the line supporting insulator assembly 27 supporting the power transmission line 3, and the discharge electrode 13a is connected to the lower end of the lightning isolator unit 10, so that the horizontal series gap 11 is formed between the discharge electrodes 13a and 13b. The upper conductor 42 of the lightning isolator unit 10 is mechanically connected to the fitting 8 in an electrically insulated relationship by the insulator members 9. The L-shaped conductor 18 is connected at its right-hand end to the left-hand end of the conductor 42, and the operation indicator 6F is electrically and mechanically connected between the left-hand end of the L-shaped conductor 18 and the grounding conductor 5 erected on the fitting 8. The flashover indicator 6C is provided on the conductor 18. The operations of the operation indicator 6F and the flashover indicator 6C are the same as those described in connection with FIG. 13.

Figure 15:
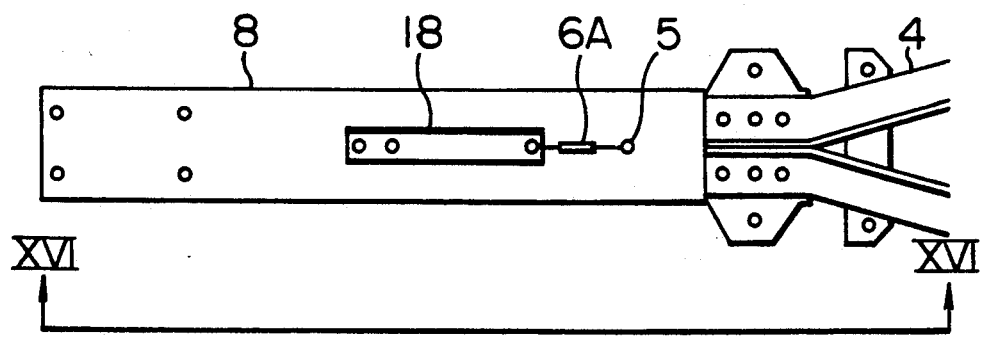
FIGS. 15 and 16 are a plan view and a front elevational view, respectively, of a seventh embodiment of the lightning arrester of the present invention.
Figure 16:
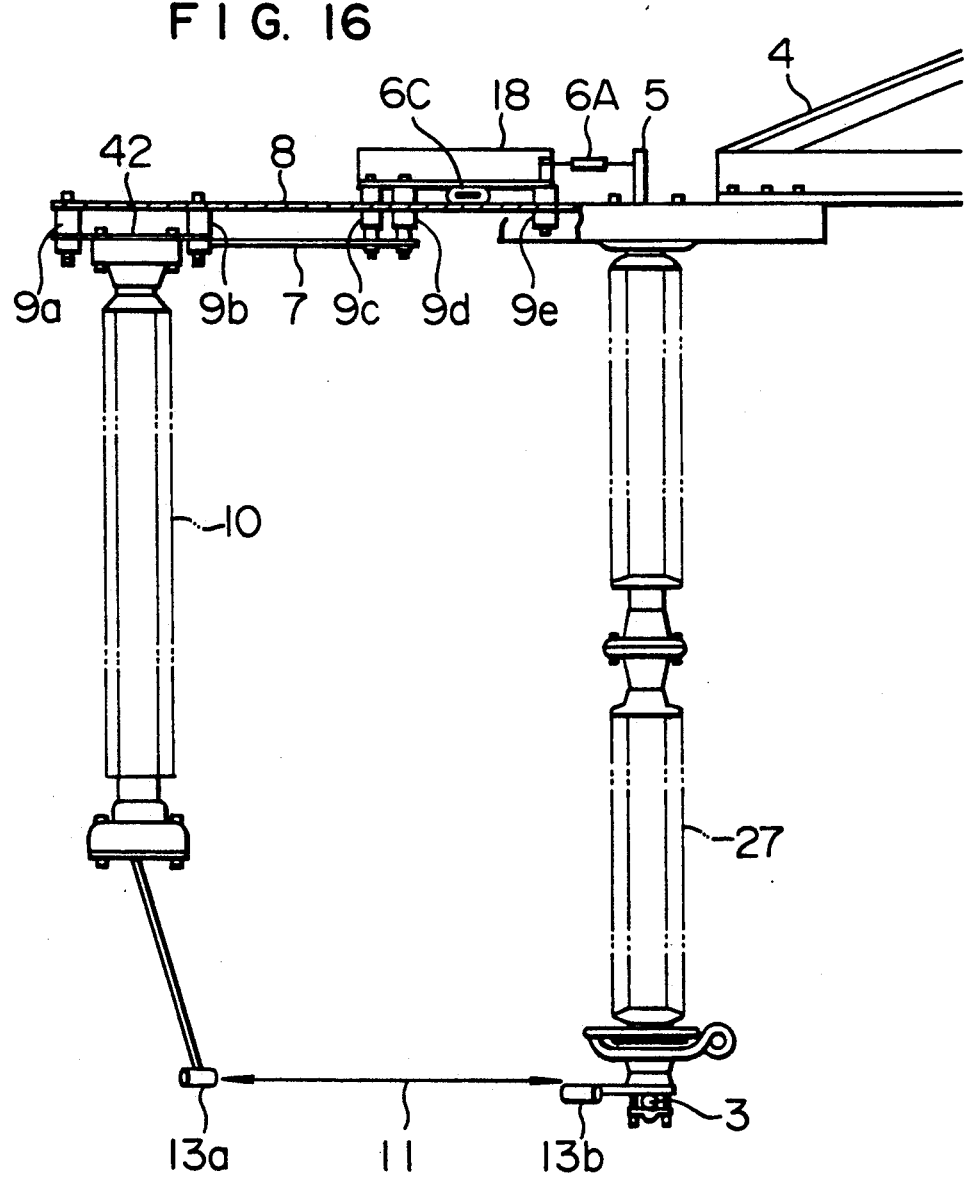

In the seventh embodiment of FIGS. 15 and 16, the lightning arrester system of the present invention the tension insulator assembly 27 is also used in lieu of the suspension insulator string 32.

Referring to FIGS. 15 and 16, the discharge electrode 13b is connected to the lower end of the insulator assembly 27 supporting the power transmission line 3, and the discharge electrode 13a is connected to the lower end of the lightning isolator unit 10, so that the horizontal series gap 11 is formed between these discharge electrodes 13a and 13b. The upper conductor 42 of the lightning isolator unit 10 is fixed to the inverted U-shaped fitting 8 in an electrically insulated relationship by a plurality of members 9a and 9b of an electrical insulator. This fitting 8 extends in the horizontal direction and is fixedly supported at its right-hand end to the arm structure 4 of the tower and supports the lightning isolator unit 10 by its free end. The ground-side conductor 7, electrically insulated from the fitting 8 by the insulator members 9a and 9b, is connected at its left-hand end to the grounded side of the lightning isolator unit 10. The ground-side conductor 7, electrically insulated from the fitting 8 by the insulator members 9a and 9b, is electrically connected at its right-hand end to the L-shaped conductor 18 by bolts. This conductor 18 is horizontally disposed above the fitting 8 and is fixed to the fitting 8 in an electrically insulated relationship from the fitting 8 by a plurality of insulator members 9c, 9d and 9e. The conductor 18 is connected to the grounding conductor 5 provided on the fitting 8 through the operation indicator 6A shown in FIG. 4, and the flashover indicator 6C is disposed beneath the conductor 18.

Thus, the grounded side of the lightning isolator unit 10 is grounded by the route from the conductor 42 the ground-side conductor 7, the operation indicator 6A, the grounding conductor 5 and the fitting 8 to the arm structure 4.

The operation indicator 6A may be connected between the ground-side conductor 7 and the fitting 8, and the flashover indicator 6C may be disposed in close proximity to the grounding conductor 7. However, because of the provision of the conductor 18, the operation indicator 6A and the flashover indicator 6C can be disposed above the fitting 8, so that inspection of these indicators is facilitated.

Figure 17:
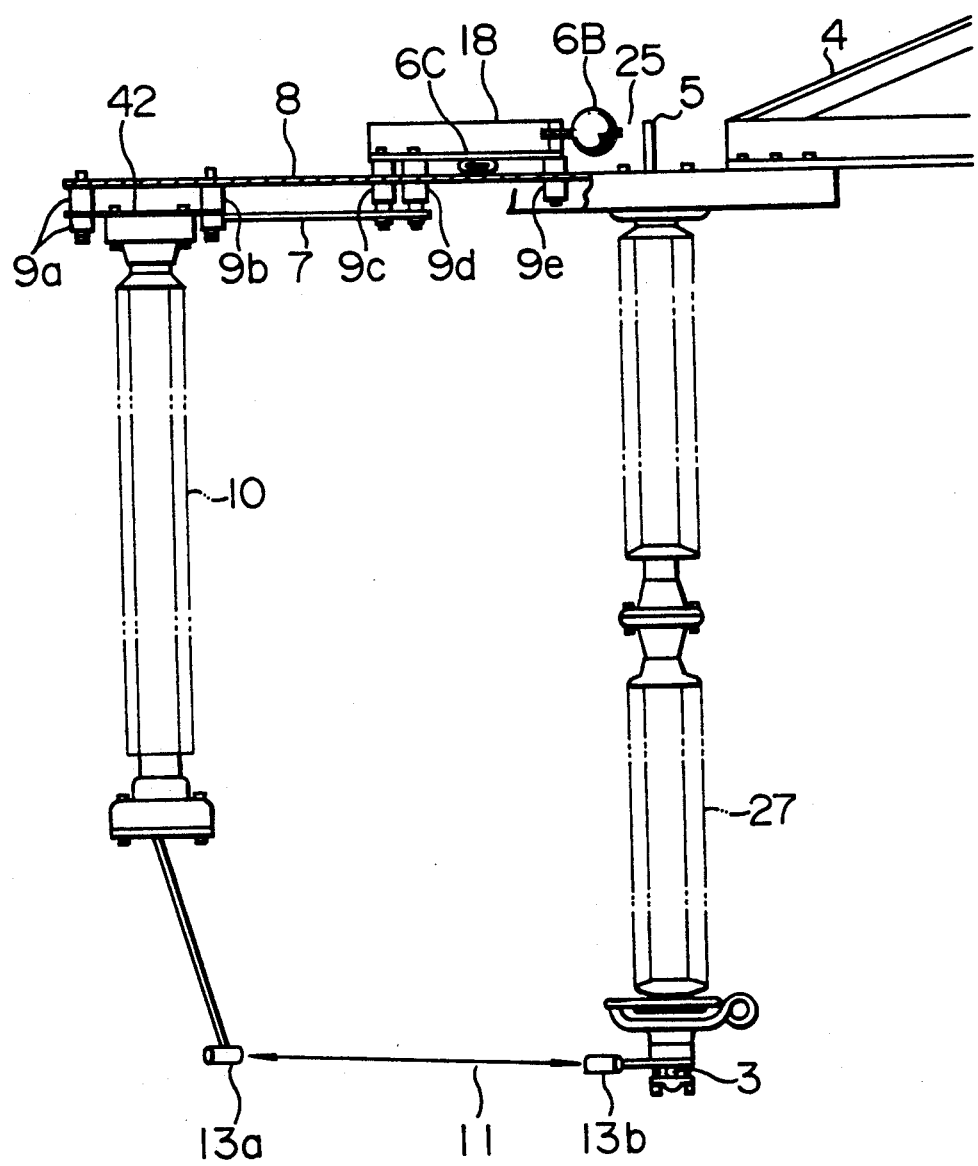
FIG. 17 is a front elevational view of an eighth embodiment of the lightning arrester of the present invention.
Figure 18:
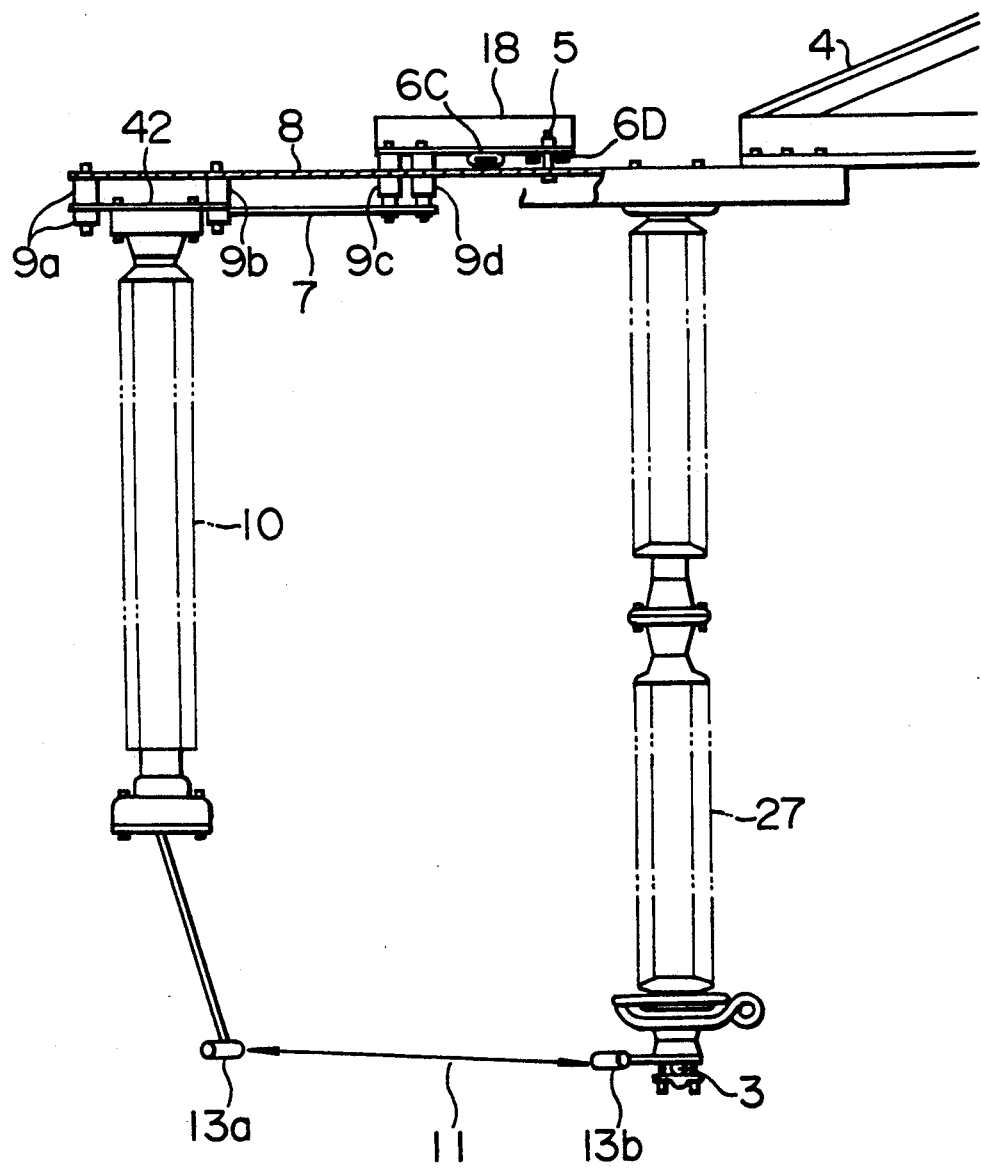
FIG. 18 is a front elevational view of a ninth embodiment of the lightning arrester of the present invention.

FIGS. 17 and 18 show an eighth and a ninth embodiment respectively of the lightning arrester system of the present invention in each of which the transmission-line supporting insulator assembly 27 is used. In FIG. 17, the operation indicator 6A shown in FIG. 16 is replaced by the failure indicator 6B known as the spherical flashover indicator shown in FIG. 7. In FIG. 18, the insulator member 9e shown in FIG. 16 is removed, and the conductor 18 and the fitting 8 are connected by the grounding conductor 5 provided on the fitting 8. In FIG. 18, the operation indicator 6D is also formed by a current transformer surrounding the grounding conductor 5. Thus, the effects of these embodiments are similar to those of the aforementioned embodiments.

The above description is directed to the suspension type lightning isolator according to the present invention.

Figure 19:
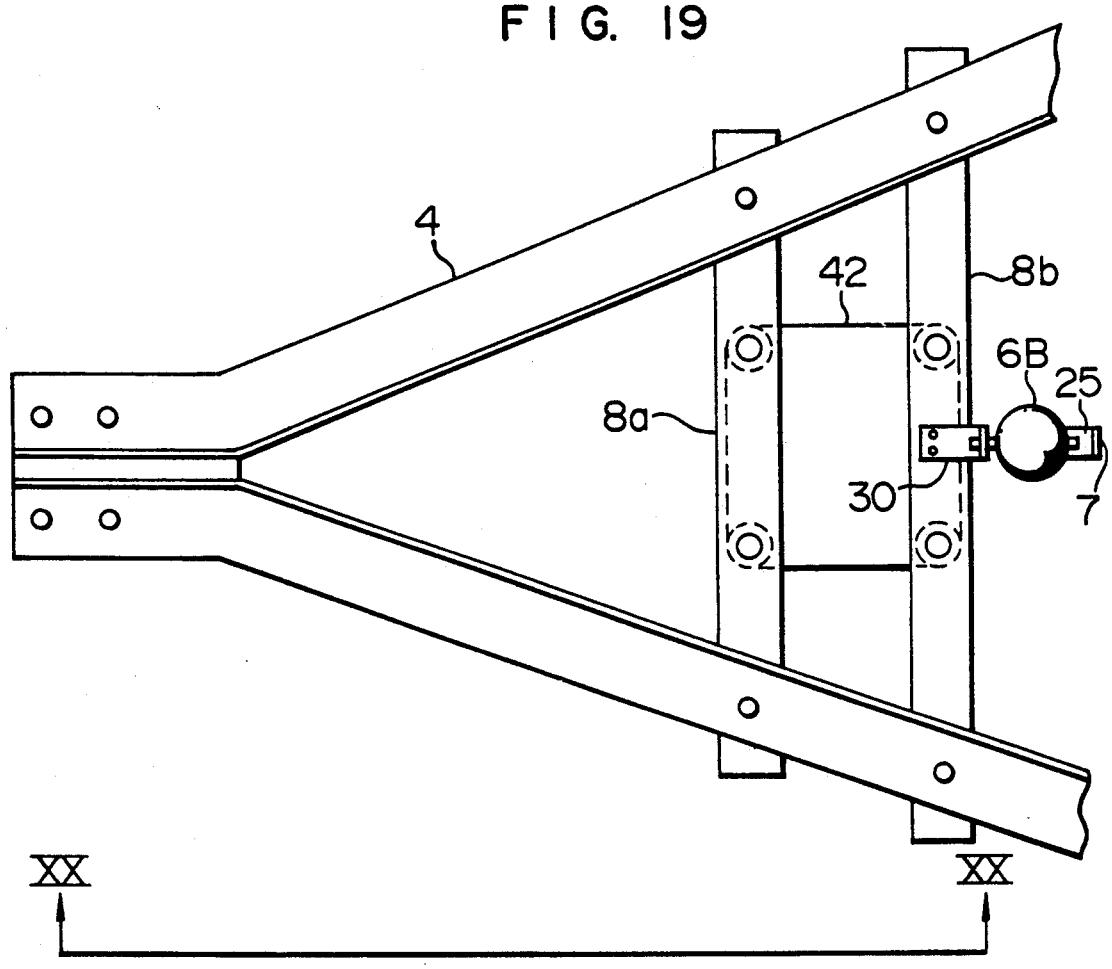
FIGS. 19 and 20 are a plan view and a front elevational view, respectively of a tenth embodiment of the lightning arrester of the present invention.
Figure 20:
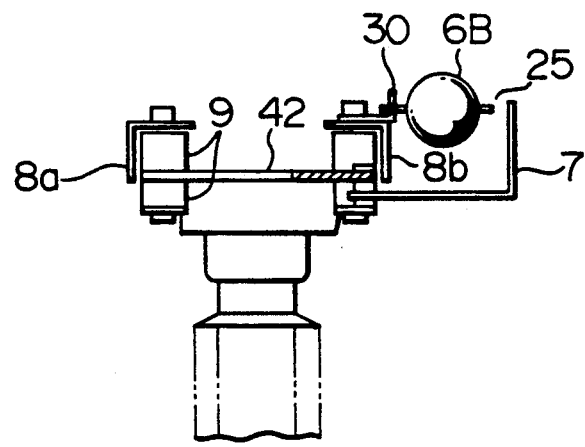

FIGS. 19 and 20 are a plan view and a partial front elevational view respectively of a tenth embodiment of the present invention which is a tension type lightning isolator.

Referring to FIGS. 19 and 20, fittings 8a and 8b are fixed to the inner surface of the arm structure 4 of the tower (not shown), and the conductor 42 connected to the grounded side of the lightning isolator unit 10 is fixedly supported on these fittings 8a and 8b in a relation electrically insulated by the insulator members 9. The ground-side conductor 7 is electrically connected to the conductor 42, and a grounding conductor 30 is electrically connected to the fitting 8b. The failure indicator 6B and the gap 25 shown in FIG. 7 are provided between the ground-side conductor 7 and the grounding conductor 30.

The above arrangement is advantageous in that the lightning isolator unit 10 can be firmly supported by the fittings 8a and 8b fixed to the arm the overall size of the apparatus including the operation indicator 6B can be made small and compact.

Figure 21:
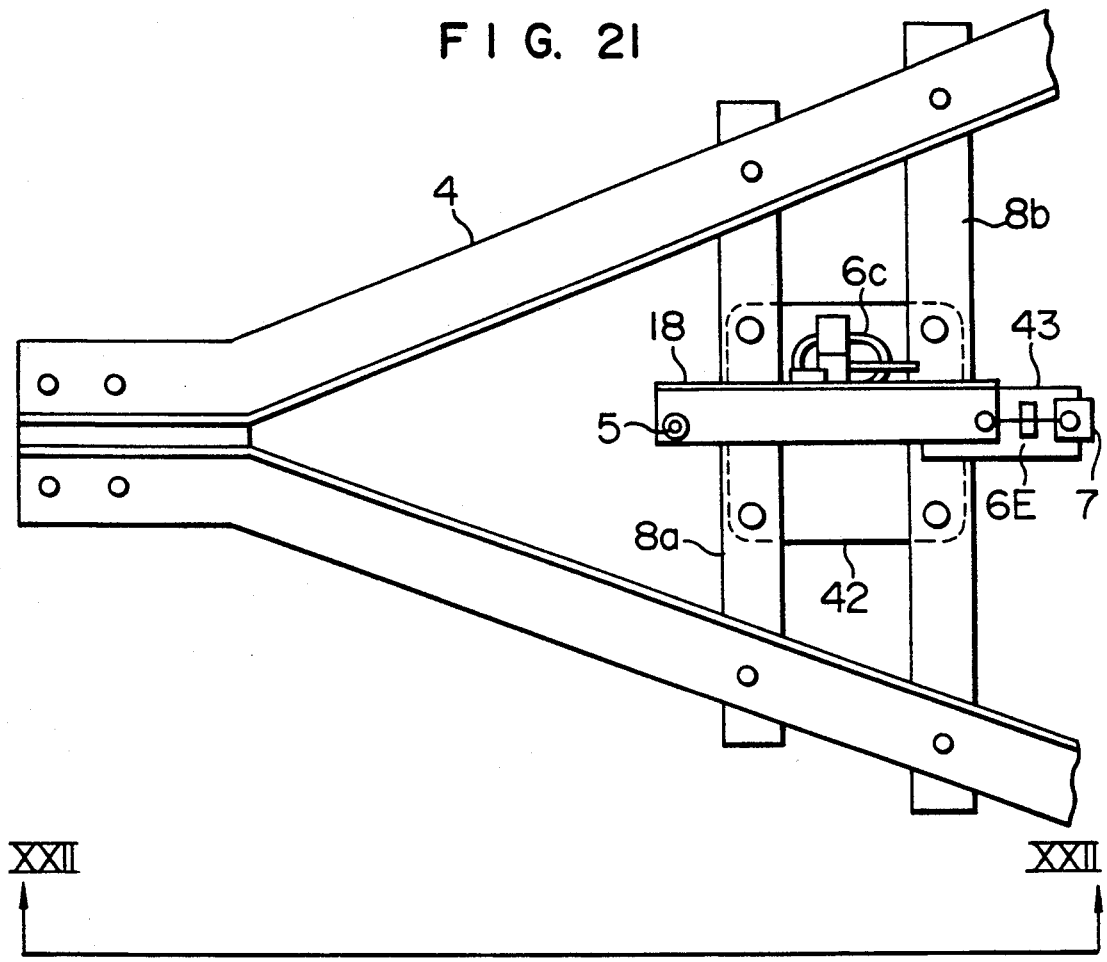
FIGS. 21 and 22 are a plan view and a front elevational view respectively of an eleventh embodiment of the lightning arrester of the present invention.
Figure 22:
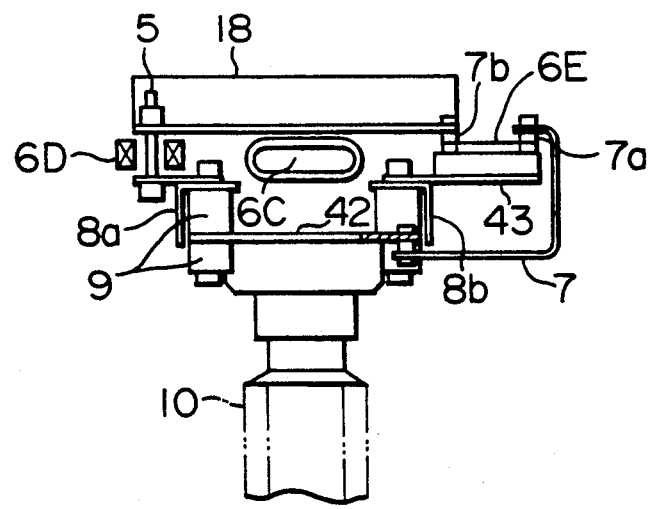

FIGS. 21 and 22 show an eleventh embodiment of the present invention in which an improvement is made in the structure shown in FIGS. 19 and 20.

Referring to FIGS. 21 and 22, a supporting member 43 is fixed to the fitting 8b to support a first terminal 7a of the ground-side conductor 7 in electrically insulated relation. A second terminal 7b is located opposite to the first terminal 7a, and the operation recorded 6E is provided between these two terminals 7a and 7b. As described above, this operation recorder 6E is formed of a conductor connected between the terminals 7a and 7b, a magnetic tape for recording magnetic flux flowing through this conductor, etc. The right-hand end of the L-shaped conductor 18 is electrically connected to the second terminal 7b. The L-shaped conductor 18 is located above the lightning isolator unit 10 and electrically connected and mechanically fixed to the fitting 8a by the grounding conductor 5 fixedly supported on the fitting 8a. The L-shaped conductor 18 is supported at its right-hand end on the fitting 8b through the terminal 7b and the supporting member 43. A current transformer surrounding the grounding conductor 5 forms the operation indicator 6D, and the flashover indicator 6C detecting the operation of the lightning isolator unit 10 is disposed beneath the L-shaped conductor 18.

According to the above arrangement, the grounded side of the lightning isolator unit 10 is grounded through the route which is traced from the conductor 42, the ground-side conductor 7, the terminal 7a, the operation recorder 6E, the terminal 7b the L-shaped conductor 18, the grounding conductor 5, and the fitting 8a to the arm structure 4. Further, because the operation indicator 6D, the operation recorder 6C and the flashover indicator 6E are collectively disposed above and in the vicinity of the lightning isolator unit 10, the overall scale of the apparatus can be made small and compact.

FIG. 23 depicts the features and the manner of failure identification by the operation indicators 6A, 6B, 6D, 6F, the flashover indicator 6C and the operation recorder 6E used as the operation detection device 6 in the aforementioned embodiments of the present invention.

Figure 24:
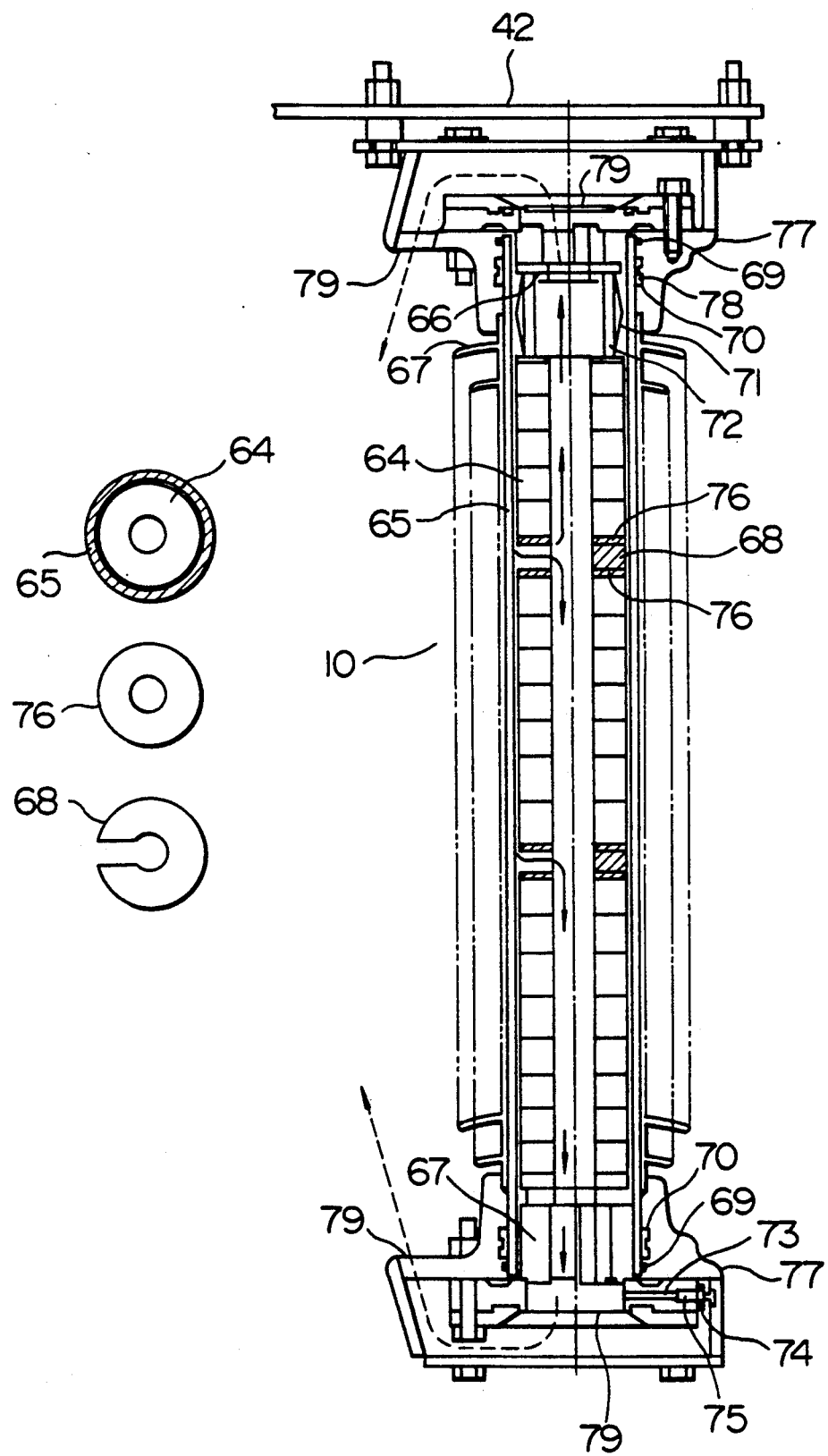
FIG. 24 is a longitudinal sectional view showing in detail the practical structure of the lightning arrester system of FIG. 2 which illustrates the basic principle of the present invention.

FIG. 24 is a longitudinal sectional view showing in detail the practical structure of the lightning isolator unit 10 shown in FIG. 2 which illustrates the basic principle of the present invention.

As shown in FIG. 24, the lightning isolator unit 10 including a plurality of zinc oxide elements 64 having an excellent nonlinear voltage-current characteristic stacked in series in a cylindrical member 65 of an electrical insulator and are pressurized by a connection plate 71 having a biasing spring 72 interposed between it and a holding member 66. When a lightning surge current is supplied as a result of discharge, the lightning isolator unit 10 interrupts flow of a follow current from the system.

Because the lightning arrester system for the power transmission line is installed on the tower supporting the power transmission line 3, a light weight and an improved explosion proof construction is required as compared to that used for a power substation. In order to satisfy these two conditions, a covering 67 of silicone rubber is used to cover the electrical insulating cylindrical member 65 in lieu of a porcelain covering. Because the porcelain covering is unnecessary, the lightning isolator unit 10 can be made light weight and can withstand a heat shock.

However, when the zinc oxide elements 64 are merely stacked up, the lightning isolator unit 10 cannot withstand an internal pressure rise due to a ground current which flows when the zinc oxide elements 64 are burned by an excessively large surge current. This phenomenon can be prevented by increasing the volume of the internal space of the cylindrical member 65. According to the present invention, the undesirable internal pressure rise is minimized by employing the zinc oxide elements 64 having a doughnut-like shape thereby utilizing the internal volume of such a shape. Further, a suitable number of connection plates 68 having a partly cut-out doughnut-like shape are interposed so as to deal with an internal pressure rise resulting from occurrence of creeping flashover along the outer surfaces of the zinc oxide elements 64. By virtue of the provision of the connection plates 68, a pressure produced between the inner surface of the cylindrical member 65 and the outer surfaces of the zinc oxide elements 64 is guided toward the inner surfaces of the zinc oxide elements 64 so as to minimize the internal pressure rise. A pair of connection plates 76 of a metal are disposed on both surfaces of each of the doughnut-shaped connection plates 68 and are connected to the zinc oxide elements 64. The built-up internal pressure breaks pressure discharging plates 79 disposed at both ends of the lightning isolator unit 10 and is discharged to the outside through pressure discharging openings of metal members 77, and the both ends of each of the metal members 77 are shorted by an arc to discharge the pressure.

The metal members 77 are formed with grooves 70 which act to ensure firm engagement of the metal members 77 with the cylindrical member 65 thereby increasing the mechanical strength of the cylindrical member 65. Thus, lightning isolator unit 10 can be provided. O-rings 69 are interposed between the cylindrical member 65 and the metal members 77 in the lightning isolator unit 10 so as to improve the gas-tightness of the cylindrical member 65.

A plug 75 for gas-tight sealing purpose is mounted during assembling the lightning isolator unit 10, and O-rings 73 and 74 are provided so as to ensure the gas-tight sealing of the plug 75.

It will be understood from the foregoing detailed description that the present invention provides a lightning isolator system for a power transmission line, which is characterized in that a lightning isolator unit electrically insulated at its grounded side is fixedly supported by a fitting fixed to an arm structure of a tower, and an operation detection device is connected between the grounded side of the lightning isolator unit and the fitting. Because of the above structure of the lightning arrester, system current flowing from the grounded side of the lightning isolator unit toward the fitting can be detected by the operation detection device so that the protective effect of the lightning isolator unit can be obtained.

We claim:

1. A lightning arrester system for a power transmission line comprising a container including a lightning isolator unit connected between the power transmission line and an arm structure of a tower, wherein a fitting is fixed to said arm structure, the container of said lightning isolator unit being fixedly supported by said fitting in an electrically insulated relationship therefrom, and wherein an operation detection device is connected between one end of said lightning isolator unit and said fitting.

2. A lightning arrester system for a power transmission line according to claim 1, wherein an operation indicator is used as said operation detection device.

3. A lightning arrester system for a power transmission line according to claim 1, wherein a flashover indicator is used as said operation detection device.

4. A lightning arrester system for a power transmission line according to claim 1, wherein an operation recorder is used as said operation detection device.

5. A lightning arrester system for a power transmission line according to claim 1, wherein a balance is provided on said fitting at the end remote from the end associated with said lightning arrester unit.

6. A lightning arrester system for a power transmission line according to claim 1, wherein said lightning isolator unit includes a cylindrical member of an electrical insulator covered with a covering of silicone rubber, a plurality of zinc oxide elements having a donut-like shape built in said cylindrical member, said zinc oxide elements being stacked together with a suitable number of connection plates having a partly cut-out donut-like shape.

7. A lightning arrester system for a power transmission line according to claim 6, wherein said lightning isolator unit further includes O-rings interposed between metal members and both ends of said cylindrical members respectively, each of said metal members being formed with grooves to ensure a firm engagement between the respective metal members and said cylindrical member.

8. A lightning arrester system for a power transmission line comprising a container including a lightning isolator unit connection between the power transmission line and an arm structure of a tower, wherein a fitting is substantially horizontally fixed to said arm structure, a ground-side conductor is fixed at a first end to a grounded side of said container of said lightning isolator unit and, at an opposite end, is vertically disposed at a position opposed to said fitting, an adjusting spacer is connected between the vertically opposed portion of said ground-side conductor and said fitting is in an electrically insulated relationship from said ground-side conductor, and wherein an operation detection device is connected between said ground-side conductor and said fitting.

9. A lightning arrester system for a power transmission line according to claim 8, wherein an operation indicator is used as said operation detection device.

10. A lightning arrester system for a power transmission line according to claim 8, wherein a flashover indicator is used as said operation detection device.

11. A lightning arrester system for a power transmission line according to claim 8, wherein an operation recorder is used as said operation detection device.

12. A lightning arrester system for a power transmission line according to claim 8, wherein a balance is located on said fitting at the end remote from the end associated with said lightning arrester unit.

13. A lightning arrester system for a power transmission line comprising a container including a lightning isolator unit connected between the power transmission line and an arm structure of a tower, wherein a fitting is fixed to said arm structure, the container of said lightning isolator unit is fixedly supported by said fitting in an electrically insulated relationship therefrom, an operation detecting device is connected between one end of said container of said lightning isolator unit and said fitting, and wherein a vertical series gap is formed between a discharge electrode provided on another end of the container forming a high voltage side of said lightning isolator unit and a discharge electrode connected to said power transmission line.

14. A lightning arrester system for a power transmission line according to claim 13, wherein an operation indicator is used as said operation detection device.

15. A lightning arrester system for a power transmission line according to claim 13, wherein a flashover indicator is used as said operation detection device.

16. A lightning arrester system for a power transmission line according to claim 13, wherein an operation recorder is used as said operation detection device.

17. A lightning arrester system for a power transmission line according to claim 13, wherein a balancer is provided on said fitting at the end remote from the end associated with said lightning arrester unit.

18. A lightning arrester system for a power transmission line comprising a container including a lightning isolator unit connected between the power transmission line and an arm structure of a tower, wherein a fitting is fixed to said arm structure, the container of said lightning isolator is fixedly supported by said fitting and electrically insulated therefrom, an operation detection device is connected between one end of said container of said lightning isolator unit and said fitting, and wherein a horizontal series gap is formed between a discharge electrode provided on another end of the container forming a high voltage side of said lightning isolator unit and a discharge electrode connected to said power transmission line.

19. A lightning arrester system for a power transmission line according to claim 18, wherein an operation indicator is used as said operation detection device.

20. A lightning arrester system for a power transmission line according to claim 18, wherein a flashover indicator is used as said operation detection device.

21. A lightning arrester system for a power transmission line according to claim 18, wherein an operation recorder is used as said operation detection device.

22. A lightning arrester system for a power transmission line according to claim 18, wherein a balancer is provided on said fitting at the end remote from the end associated with said lightning arrester unit.

23. A lightning arrester system for a power transmission line, the lightning arrester system comprising:
    an arm structure of a tower;
    a fitting fixed to said arm structure;
    a suspension insulator string having one end connected to said fitting for suspending said power transmission line at the end of said suspension insulator spring;
    a ground-side conductor mounted on said fitting and opposed by an insulator spacer therebetween;
    a grounding conductor connected between one end of said ground-side conductor and said fitting;
    a lightning isolator unit connected to the other end of said ground-side conductor;
    a failure detector device connected in circuit with said grounding conductor for fusing and cutting off said grounding inductor due to heat generated by an abnormal current through said lightning arrester system; and
    a series gap formed between said lightning isolator unit and said power transmission line.

* * * * *